Figure 1:
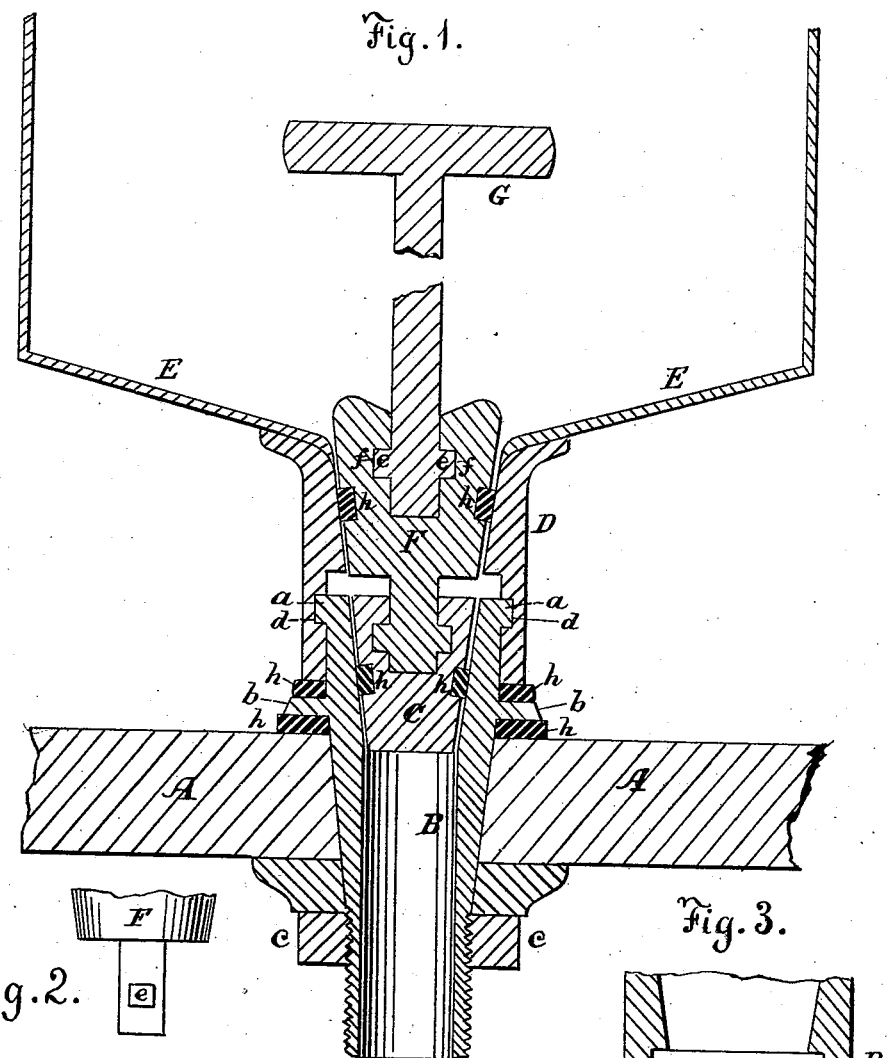

E. COWLES.
Detachable Discharge Stoppers and Connections for Milk and other Vessels.

No. 226,838. Patented April 27, 1880.

Witnesses:
Geo. C. Gibbs
S. B. Champion

Inventor:
Edward Cowles.

UNITED STATES PATENT OFFICE.

EDWARD COWLES, OF FISHKILL, NEW YORK.

DETACHABLE DISCHARGE-STOPPER AND CONNECTION FOR MILK AND OTHER VESSELS.

SPECIFICATION forming part of Letters Patent No. 226,838, dated April 27, 1880.

Application filed April 19, 1879.

*To all whom it may concern:*

Be it known that I, EDWARD COWLES, of the town of Fishkill, in the county of Dutchess and State of New York, have invented a new and useful Improvement in Detachable Discharge-Stoppers and Connections for Milk and other Vessels, which improvement is fully set forth in the following specification, reference being had to the accompanying drawings.

The object of my invention is to provide a comparatively simple and effective way by which one vessel can be secured rigidly within another vessel, and also be easily and readily detached therefrom and removed, with or without its contents, when required, and at the same time will permit of the liquid contents of the inner vessel being drawn off or discharged through a connected orifice in the bottom of each vessel, and without mixing or coming in contact with the liquid or other matter contained in the outer or inclosing vessel, and also, when the inner vessel is removed, will permit of the discharge of the liquid contents of the outer vessel through the then disconnected orifice into the conducting-pipe below, and thence wherever required by any ordinary method.

This invention is useful in many cases in the preparation or manufacture of pharmaceutical compounds, but more especially in dairies and creameries, where, by means of my improvement, milk may be drawn from the inner vessel containing it through the bottom of the inclosing-vessel or water-reservoir, in which the milk-cans frequently are placed, after which the flow can be stopped and the can, now containing only cream, may be easily removed from the reservoir, thus effecting a great saving in the physical exertion usually required in performing this operation.

This invention consists of two cylindrical and conical pipes or tubes for discharging liquids through the bottom of vessels to which they may be attached, and where one vessel is designed to be placed within the other, and so constructed that they may be used together as a simple orifice or discharge-pipe to the inner vessel, or they may be instantly unlocked and disconnected and used independently of each other.

Each of these pipes or tubes is also provided with a stopper of improved construction, which can be locked together as one and placed in the pipes or removed when desired, or they, too, may be instantly unlocked and disconnected and used as independent stoppers to their respective pipes.

It will be noticed that all of this connecting or disconnecting or adjustment of pipes or stoppers is made from the upper or inner side of the vessels to which they are attached, and not from underneath, where often the position is not easily accessible to the hand.

In the drawings, Figure 1 is intended to represent a vertical section of my invention.

A is the bottom of the outer or inclosing vessel, downward through which passes the pipe B, resting upon a flange, *b*, and secured in place by a threaded nut, *c*, or in any other suitable way. The upper end of this pipe is so formed and enlarged that the conical stopper C will properly fit its aperture.

Figure 3:
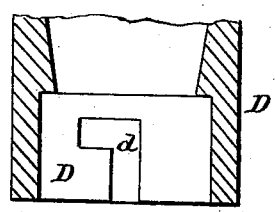

D is a shell or short tube, permanently attached to the bottom E of the inner vessel by soldering or otherwise, and is also fitted so as to inclose the upper end of the pipe B, and to be readily attached to it by means of two or more pins or lugs, *a*, on the pipe, closely fitting into a corresponding number of longitudinal and transverse or nearly right-angled slots *d* in the shell. (More fully shown in another sectional view, Fig. 3.) The internal diameter of the shell must be sufficiently large to permit the stopper C to pass freely through it, and it should also be so formed and enlarged at the upper end as to properly receive the stopper F.

Figure 2:
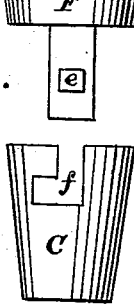

The stem of the winch G is inserted into a seat in the top of the stopper F, the pins or lugs *e* of the stem entering into corresponding longitudinal and transverse slots *f* in the stopper. A part of the stopper F in like manner enters into the stopper C, and when required locks the two together by means of similar lugs and slots. (More fully shown in Fig. 2.)

Rubber or other packing-rings *h* may be used to prevent leakage, if necessary.

To remove both stoppers, insert the winch and turn to the right. The stoppers will then lock and both draw out together.

To remove the inner vessel and contents, and at the same time prevent the discharge of the liquid from the outer vessel, turn the inner vessel to the left, thus unlocking the shell from the main discharge-pipe and the stoppers from each other.

Whenever the inner vessel is removed the contents of the outer vessel can be drawn off by removing the stopper C.

It is evident that the slots can be so constructed as to lock either to the right or to the left, and not change the nature of the invention.

What I claim as my invention, and desire to secure by Letters Patent, is—

The combination with respect to each other, and in connection with the two vessels A and E, of the two discharge-pipes—namely, the pipe B and the tube or shell D—and the two stoppers C and F, substantially as herein described, and for the purposes set forth.

EDWARD COWLES.

Witnesses:
A. J. CHAMPION,
S. B. CHAMPION.